US011089640B2

(12) United States Patent
Gao et al.

(10) Patent No.: US 11,089,640 B2
(45) Date of Patent: Aug. 10, 2021

(54) METHOD AND SYSTEM FOR USER INFORMATION MANAGEMENT

(71) Applicant: ZTE Corporation, Guangdong (CN)

(72) Inventors: Yin Gao, Guangdong (CN); He Huang, Guangdong (CN)

(73) Assignee: ZTE Corporation, Guangdong (CN)

( * ) Notice: Subject to any disclaimer, the term of this patent is extended or adjusted under 35 U.S.C. 154(b) by 164 days.

(21) Appl. No.: 16/547,549

(22) Filed: Aug. 21, 2019

(65) Prior Publication Data
US 2019/0380158 A1 Dec. 12, 2019

Related U.S. Application Data

(63) Continuation of application No. PCT/CN2018/076794, filed on Feb. 14, 2018.

(30) Foreign Application Priority Data

Mar. 16, 2017 (CN) .......................... 201710156709.4

(51) Int. Cl.
H04W 76/11 (2018.01)
H04W 8/22 (2009.01)
(Continued)

(52) U.S. Cl.
CPC .............. H04W 76/11 (2018.02); H04W 8/22 (2013.01); H04W 8/26 (2013.01);
(Continued)

(58) Field of Classification Search
CPC ......... H04W 76/11; H04W 8/22; H04W 8/26; H04W 72/0453; H04W 88/02; H04W 88/08; H04W 76/12; H04W 76/18
See application file for complete search history.

(56) References Cited

U.S. PATENT DOCUMENTS 10,979,944 B2 * 4/2021 Yiu .................. H04W 36/0055
2014/0308961 A1 * 10/2014 Xu .................... H04W 36/0072
455/438
(Continued)

FOREIGN PATENT DOCUMENTS

CN 101815359 A 8/2010
CN 102986258 A 3/2013
(Continued)

OTHER PUBLICATIONS

LG Electronics Inc., "Transmission of RRC message via CU-DU interface," 3GPP TSG-RAN WG3 Meeting #95, Athens, Greece, R3-170405, 4 pages, Feb. 2017.
(Continued)

Primary Examiner — Hassan Kizou
Assistant Examiner — Abdullahi Ahmed
(74) Attorney, Agent, or Firm — Perkins Coie LLP

(57) ABSTRACT

A method of user information management includes that, a first network element transmits a setup request message of a user equipment (UE) radio bearer context to a second network element, the setup request message includes at least one of the following information: a first UE association flag, configuration information about signaling radio bearers (SRBs) or information about SRB transmission channel uplink address; and upon reception of a setup response message of the UE radio bearer context fed back by the second network element, the first network element determines that information of the UE radio bearer context is established by the second network element; the setup response message includes at least one of the following information: configuration information about SRBs set up by the second network element, configuration information about modified SRBs, a second UE association flag, infor- (Continued)

mation about SRB transmission channel downlink address, or a cause value for configuration modification.

20 Claims, 7 Drawing Sheets

(51) Int. Cl.
*H04W 8/26* (2009.01)
*H04W 72/04* (2009.01)
*H04W 88/02* (2009.01)
*H04W 88/08* (2009.01)

(52) U.S. Cl.
CPC ........ *H04W 72/0453* (2013.01); *H04W 88/02* (2013.01); *H04W 88/08* (2013.01)

(56) References Cited

U.S. PATENT DOCUMENTS

| | | | |
|---|---|---|---|
| 2015/0038155 A1 | 2/2015 | Wang | |
| 2016/0113054 A1 | 4/2016 | Chen et al. | |
| 2017/0273125 A1* | 9/2017 | Teyeb | H04W 76/15 |
| 2019/0159086 A1* | 5/2019 | Xu | H04W 88/02 |
| 2019/0159273 A1* | 5/2019 | Shi | H04W 76/12 |
| 2019/0313296 A1* | 10/2019 | Yiu | H04W 36/38 |
| 2019/0327644 A1* | 10/2019 | Gao | H04W 76/12 |
| 2020/0100304 A1* | 3/2020 | Liu | H04W 76/10 |
| 2020/0145967 A1* | 5/2020 | Park | H04W 72/0426 |

FOREIGN PATENT DOCUMENTS

| | | |
|---|---|---|
| CN | 103716885 A | 4/2014 |
| CN | 104540160 A | 4/2015 |
| CN | 106162730 A | 11/2016 |
| CN | 106332048 A | 1/2017 |
| CN | 106341851 A | 1/2017 |
| RU | 2462839 C2 | 9/2012 |
| RU | 2504119 C2 | 1/2014 |
| WO | 2016/159841 A1 | 10/2016 |

OTHER PUBLICATIONS

Chinese Office Action dated Oct. 18, 2019 for Chinese Patent Application No. 201710156709.4, filed on Feb. 14, 2018 (13 pages).
International Search Report and Written Opinion dated Apr. 25, 2018 for International Application No. PCT/CN2018/076794, filed on Feb. 14, 2018 (10 pages).
ZTE Corporation, "Clarification on the deployment of CU and DU," 3GPP TSG RAN WG2 Meeting #93bis, R2-162610, 2 pages, Dubrovnik, Croatia, Apr. 2016.
Office Action of Chinese Priority Application No. 201410156709.4, dated Oct. 18, 2019, 7 pages.
Office Action of Chinese Priority Application No. 201410156709.4, dated Jan. 7, 2020, 7 pages.
Russian Search Report with Decision to Grant along with Unofficial translation on Decision, RU Appl. No 2019132619, dated May 26, 2021, 26 pages.

\* cited by examiner

METHOD AND SYSTEM FOR USER INFORMATION MANAGEMENT

CROSS REFERENCE TO RELATED APPLICATIONS

This patent document is a continuation of and claims the benefit of priority to International Patent Application No. PCT/CN2018/076794, filed on Feb. 14, 2018, which claims the benefit of priority of Chinese Patent Application No. 201710156709.4, filed on Mar. 16, 2017. The entire contents of the before-mentioned patent applications are incorporated by reference as part of the disclosure of this application.

TECHNICAL FIELD

The disclosure relates to the technical field of wireless communication systems, for example, to a method and system for user information management.

BACKGROUND

In the fifth-generation mobile communication (5G), the massive connections and the higher rate requirement of users pose a great challenge to transmission capacity of a fronthaul interface (i.e., common public radio interface (CPRI)) between a baseband processing unit (BBU) and the radio remote unit (RRU) in the Long Term Evolution (LTE). As what are transmitted through the CPRI interface are in-phase (I) signals and quadrature (Q) signals processed by physical layer encoding and modulation, the CPRI interface has high requirements for transmission delay and bandwidth.

SUMMARY

A method of user information management that includes:
a first network element transmits a setup request message of a user equipment (UE) radio bearer context to a second network element, wherein the setup request message includes at least one of the following information: a first UE association flag, configuration information about signaling radio bearers (SRBs) and information about SRB transmission channel uplink address, or a fronthaul interface exists between the first network element and the second network element; and
upon reception of a setup response message of the UE radio bearer context fed back by the second network element, the first network element determines that information of the UE radio bearer context is established by the second network element; wherein the setup response message includes at least one of the following information: configuration information about SRBs set up by the second network element, modified configuration information about SRBs, a second UE association flag, information about SRB transmission channel downlink address, or a cause value for configuration modification.

A system for user information management includes: a first network element and a second network element, wherein a fronthaul interface exists between the first network element and the second network element;
the first network element includes:
a context setup request module, configured to transmit a setup request message of a user equipment (UE) radio bearer context to the second network element, and determines that information of the UE radio bearer context established by the second network element upon reception of a setup response message of the UE radio bearer context fed back by the second network element; wherein the setup request message comprises at least one of the following information: a first UE association flag, configuration information about signaling radio bearers (SRBs), or information about SRB transmission channel uplink address;
the second network element includes:
a context setup module, configured to locally establish information of the UE radio bearer context upon reception of the setup request message of UE radio bearer context from the first network element, and feed back a setup response message of the UE radio bearer context to the first network element when the setup succeeds; wherein the setup response message includes at least one of the following information: configuration information about SRBs set up by the second network element, modified configuration information about SRBs, a second UE association flag, information about SRB transmission channel downlink address, or a cause value for configuration modification.

A system for user information management includes:
a first network element and a second network element, wherein a fronthaul interface exists between the first network element and the second network element;
wherein the first network element includes: a first memory and a first processor, wherein the first memory has computer instructions stored therein, and the first processor executes the computer instructions to implement the following method:
transmitting a setup request message of a user equipment (UE) radio bearer context to the second network element, and upon reception of a setup response message of the UE radio bearer context fed back by the second network element, establishing information of the UE radio bearer context at the second network element; wherein the setup request message includes at least one of the following information: a first UE association flag, configuration information about signaling radio bearers (SRBs), or information about SRB transmission channel uplink address;
wherein the second network element includes: a second memory and a second processor, wherein the second memory has computer instructions stored therein, and the second processor executes the computer instructions to implement the following method:
upon reception of the setup request message of UE radio bearer context from the first network element, locally establishing information of the UE radio bearer context, and when the setup succeeds, feeding back a setup response message of the UE radio bearer context to the first network element; wherein the setup response message includes at least one of the following information: configuration information about the SRBs set up by the second network element, configuration information about modified SRB, a second UE association flag, information about SRB transmission channel downlink address, or a cause value for configuration modification.

A computer readable storage medium, stores computer readable instructions, which are configured to perform the methods as described above.

DETAILED DESCRIPTION

Figure 1:
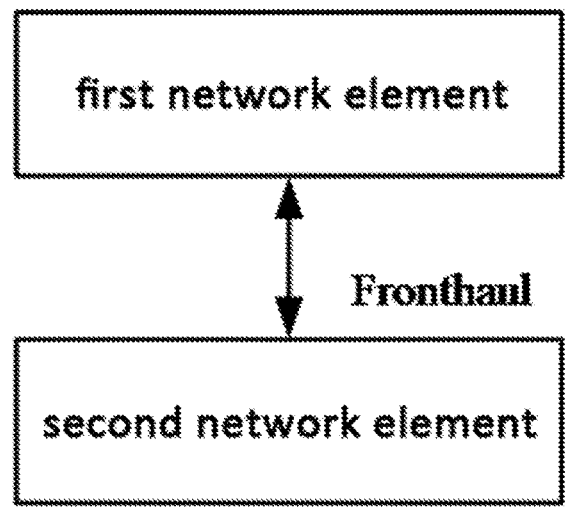
FIG. 1 is a schematic diagram of a fronthaul interface between a first network element and a second network element.

If the air interface rate in the 5G system is increased to tens of giga bits per second (Gbps), the traffic demand of the CPRI interface will rise to an order of tera bits per second (Tbps). The increase in traffic demand brings tremendous pressure on the network deployment cost and deployment difficulty. Therefore, in the 5G system, it is necessary to redefine the division mode of the fronthaul interface. For the division mode of the fronthaul interface, consideration is made in terms of transmission capacity, transmission delay, and convenience of deployment. For example, considering non-ideal fronthaul transmission, a network function that is not sensitive to delay is placed in the first network element (for example, a Centralized Unit (CU)), a delay-sensitive network function is placed in a second network element (such as a distributed unit (DU)). Data between the first network element and the second network element is transmitted through at least one of an ideal fronthaul and a non-ideal fronthaul. The transmission interface is referred to as a fronthaul interface, and the fronthaul interface between the first network element and the second network element is shown in FIG. 1.

The first protocol entity includes radio resource control (RRC), the second protocol entity includes packet data convergence protocol (PDCP), the third protocol entity includes radio link control (RLC), and the fourth protocol entity includes media access control (MAC), a physical layer, and a radio frequency unit. In an embodiment, the first network element and the second network element include different protocol entities, for example, the first network element includes a first protocol entity and a second protocol entity, and the second network element includes other protocol entities as described above.

The first network element communicates with the second network element through the fronthaul interface.

The method and system for managing user information provided by the following embodiments can implement user information management on a fronthaul interface between the first network element and the second network element.

Figure 2:
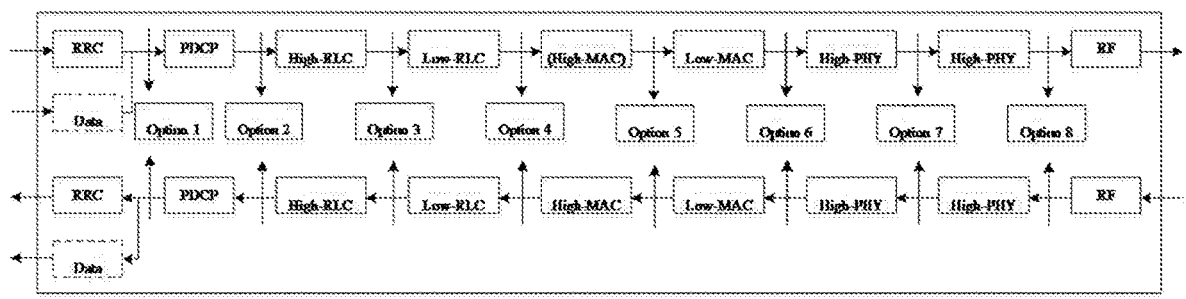
FIG. 2 is a diagram showing possible function division between the first network element and the second network element.

In the following embodiment, the first network element and the second network element exchange information through the fronthaul interface. In an embodiment, the fronthaul is an ideal fronthaul. In an embodiment, the fronthaul is a non-ideal fronthaul. The transmission delay of the ideal fronthaul is relatively small, for example, dozens of microseconds to hundreds of microseconds, and the transmission delay of the non-ideal fronthaul is relatively large, for example, in an order of milliseconds. Due to the distinction between ideal fronthaul and non-ideal fronthaul, the first network element and the second network element have different functional divisions. For example, the first network element is a CU and the second network element is a DU, the CU and the DU are separated from each other, and functions included in the CU and functions included in the DU are shown in FIG. 2.

In Option 1, RRC and PDCP are separated from each other, similar to the 1A structure in Dual Connectivity (DC). That is, RRC is located in the CU, and PDCP, RLC, Ethernet MAC, physical layer (PHY), and radio frequency (RF) and other functions are located in the DU. That is, the entire user plane (UP) is located in the DU.

In Option 2, PDCP and RLC are separated from each other, similar to the 3C structure in DC. That is, RRC and PDCP are located within the CU, and RLC, MAC, PHY, and RF functions are located in the DU.

In Option 3, a high layer of RLC is separated from a low layer of RLC. The lower layer of RLC (partial function of RLC), MAC, PHY, and RF part are located in the DU, and RRC, PDCP, and the upper layer of RLC (partial functions of RLC) functions are located in the CU.

In Option 4, RLC and MAC are separated from each other, MAC, PHY, and RF are located in the DU, and RRC, PDCP, and RLC functions are located in the CU.

In Option 5, internal functions of MAC are separated. Some MAC functions (such as Hybrid Automatic Repeat ReQuest (HARD)), PHY, and RF are located in the DU. The other upper layer functions in FIG. 2 are located in the CU.

In Option 6, MAC and PHY are separated from each other, MAC, PHY, and RF are located in the DU, and RRC, PDCP, and RLC functions are located in the CU.

In Option 7, internal functions of PHY are separated, some PHY functions and RF are located in the DU, and other upper layer functions in FIG. 2 are located in the CU.

In Option 8, PHY and RF are separated, the RF function is located in the DU, and other upper layer functions are located in the CU.

In an embodiment, user information includes UE radio bearer context.

In an embodiment, the process of implementing the user information management will be illustrated in detail from the following aspects: a process of establishing user context information at the second network element through a UE radio bearer context establishing process between the first network element (CU) and the second network element (DU), a process of reconfiguring user context information at the second network element through a UE radio bearer context reconfiguration process, and a process of deleting user context information at the second network element through a UE radio bearer context release process. In an embodiment, the user context information includes UE radio bearer information.

Figure 3:
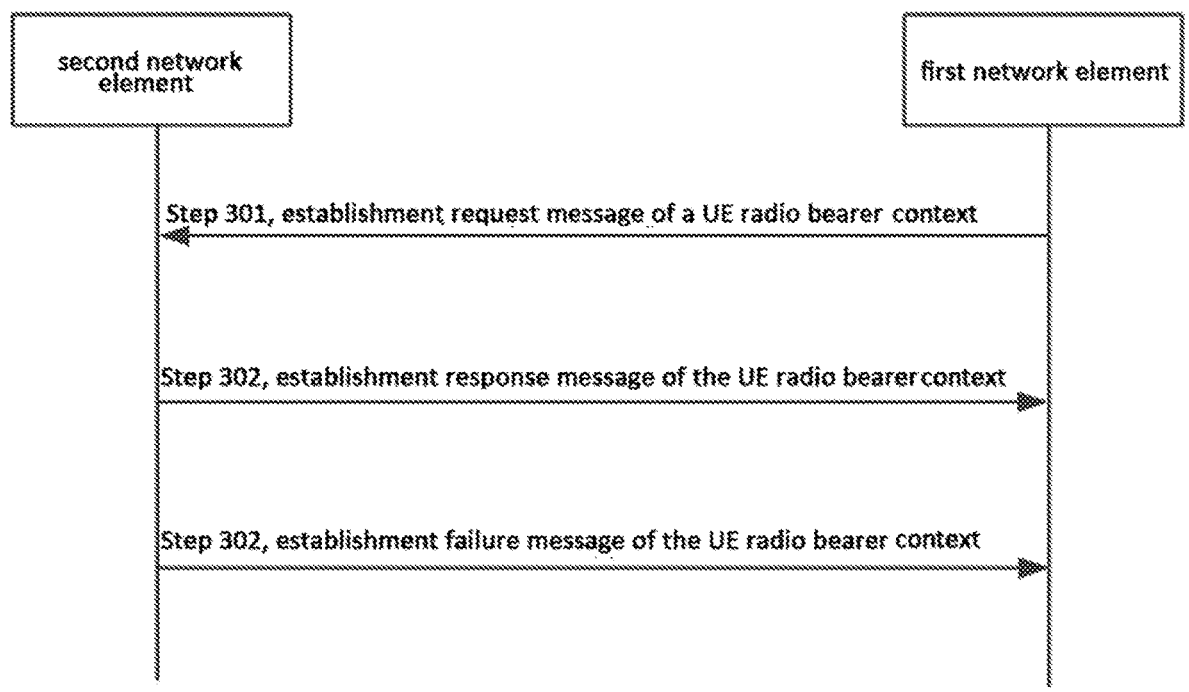
FIG. 3 is a flowchart of a method for user information management according to an embodiment.

An embodiment provides a method for user information management. As shown in FIG. 3, the method includes the following steps.

In step 301, the first network element transmits a setup request message of the UE radio bearer context to the second network element.

There is a fronthaul interface between the first network element and the second network element.

The setup request message includes one or more of the following information: a first UE association flag, configuration information about signaling radio bearers (SRBs), and information about SRB transmission channel uplink address (e.g., address of the first network element).

In an embodiment, the first UE association flag includes: an application-layer protocol (AP) identifier (ID) allocated by the first network element to uniquely identify the UE, or a temporary mobile subscriber identity (S-TMSI), or a unique ID for identifying UE by a radio access network.

In an embodiment, configuration information about the SRBs is configuration information of SRB1 (for example, used for RRC signaling transmission through the air interface) and SRB2 (for example, used for measuring signaling) allocated by the first network element.

In an embodiment, the SRB is transmitted by using the stream control transmission protocol (SCTP). Merely one SCTP channel exists between the first network element and the second network element, and the setup request message does not include the SRB transmission channel uplink address.

In an embodiment, the SRB is transmitted by using a user plane general packet radio service (GPRS) tunneling protocol-user (GTP-U), and similar to data radio bearer (DRB) transmission, the second network element allocates a GPT-U address to the SRB, and the GPT-U address includes a transport network layer (TNL) address and a tunnel endpoint identifier (TE ID).

In step 302, upon reception of a setup response message of the UE radio bearer context fed back by the second network element, the first network element determines that information of the UE radio bearer context is established by the second network element. The setup response message includes one or more of the following information: a second UE association flag, configuration information about the SRBs, information about SRB transmission channel downlink address (e.g., second network element address), and a cause value.

In an embodiment, the second UE association flag includes: an interface AP ID that is allocated by the first network element to uniquely identify the UE, and an interface AP ID that is allocated by the second network element to uniquely identify the UE; or S-TMSI; or RAN UE ID.

In an embodiment, configuration information about the SRBs includes configuration information about the SRBs that are set up by the second network element or configuration information about the modified SRBs. In an embodiment, the configuration information about the modified SRBs is the SRB configuration information after the DU modifies the SRB configuration according to resource occupation.

In an embodiment, the cause value is a cause for which the second network element modifies the configuration.

In an embodiment, in step 302, after the first network element transmits the setup request message of the UE radio bearer context to the second network element, the second network element feeds back a setup failure message of the UE radio bearer context to the first network element when failing to establish information of the UE radio bearer context. When the first network element receives the setup failure message of the UE radio bearer context fed back by the second network element, the first network element determines that the second network element fails to establish the information of the UE radio bearer context. The setup failure message includes one or more of the following information: the second UE association flag and a cause of failure.

In an embodiment, the second UE association flag includes an interface AP ID that is allocated by the first network element CU to uniquely identify the UE, and an interface AP ID that is uniquely allocated by the second network element to the UE. In an embodiment, the second UE association flag includes an S-TMSI. In an embodiment, the second UE association flag includes a RAN UE ID.

In view of the above, with the process of establishing the UE radio bearer context in the foregoing embodiment, the first network element and the second network element can establish user context information at the second network element, so as to implement user information management on the fronthaul interface between the network elements.

Figure 4:
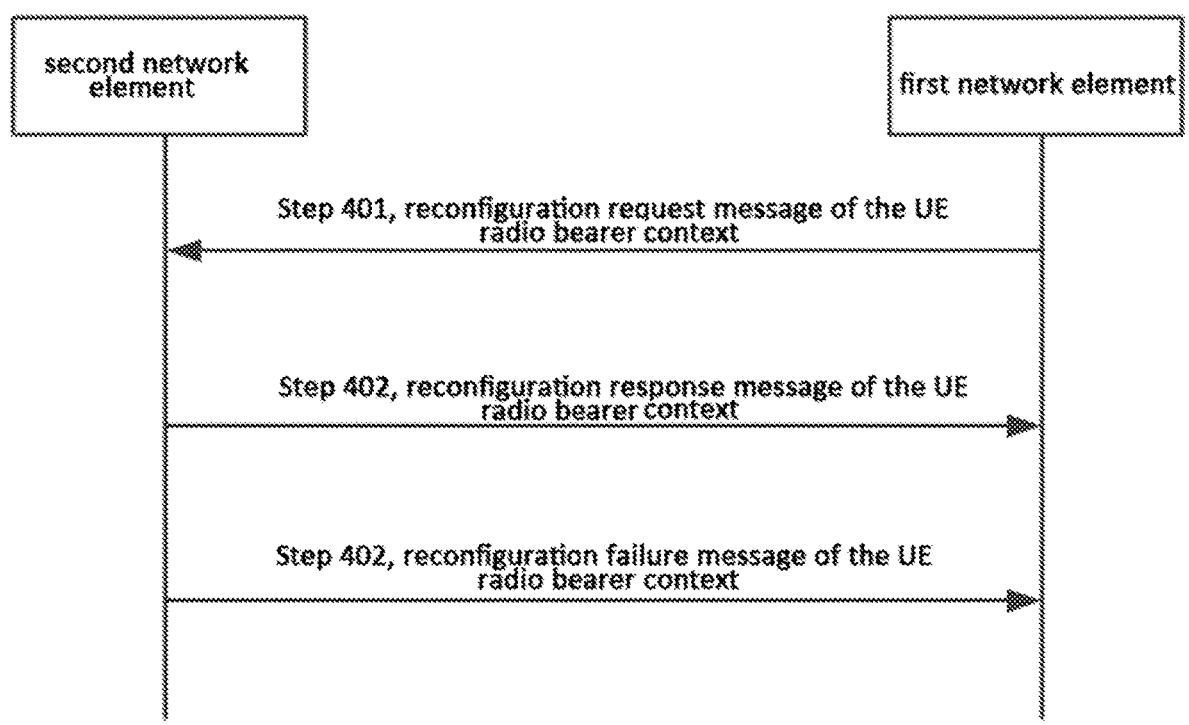
FIG. 4 is a flowchart of a method for user information management according to an embodiment.

An embodiment provides a method for managing user information. After the method for establishing information of the UE radio bearer context, the method further includes a process for modifying the UE radio bearer context. As shown in FIG. 4, the reconfiguration process includes the following steps.

In step 401, the first network element transmits a reconfiguration request message of the UE radio bearer context to the second network element, upon determining that information of the UE radio bearer context is required to be reconfigured at the second network element. The reconfiguration request message includes one or more of the following information: a second UE association flag, configuration information about data radio bearers (DRBs), information about DRB transmission channel uplink address, configuration information about the modified SRBs, or UE capability coordination information.

In an embodiment, the second UE association flag includes an interface AP ID that is allocated by the first network element to uniquely identify the UE, and an interface AP ID that is allocated by the second network element to uniquely identify the UE. In an embodiment, the second UE association flag includes an S-TMSI. In an embodiment, the second UE association flag includes a RAN UE ID.

In an embodiment, configuration information about the DRBs is configuration information related to one or more DRBs allocated by the first network element.

In an embodiment, the information about DRB transmission channel uplink address is in one of the following forms: transmission channel uplink address of each UE, transmission channel uplink address of each PDU session (SESSION), transmission channel uplink address of each service flow (FLOW), or transmission channel uplink address of each DRB.

In an embodiment, the information about DRB transmission channel uplink address is in one of the following forms: UE-based transmission channel uplink address, PDU-SESSION-based transmission channel uplink address, service-flow-based transmission channel uplink address, or DRB-based transmission channel uplink address.

In an embodiment, since there is one UE that establishes an RRC connection with the network elements (the first network element and the second network element), the PDU-SESSION-based transmission channel uplink address is DRB transmission channel uplink address established by the UE.

In an embodiment, when the UE that establishes the RRC connection with the network elements (the first network element and the second network element) supports one or more PDU sessions, the PDU-SESSION-based transmission channel uplink address is transmission channel uplink address of one of the one or more PDU sessions that are currently supported by the UE.

In an embodiment, when the UE establishes an RRC connection with the network elements (the first network element and the second network element), the service-flow-based transmission channel uplink address is transmission channel uplink address of at least one service flow that is being processed by the UE.

In an embodiment, when one or more DRBs are allocated for network element and when the UE establishes an RRC connection with the network elements (the first network element and the second network element), the DRB-based transmission channel uplink address is transmission channel uplink address of one or more DRBs that the UE is to establish or modify.

In an embodiment, the allocated channel being closer to the upper layer results in more information that can be exchanged between the first network element and the second network element. The reconfiguration request message includes transmission channel uplink address of each DRB or transmission channel uplink address of each UE. For the tunnel of each UE (TUNNEL), the PDU process level can be considered.

In an embodiment, the UE capability coordination information is information about how to allocate UE capabilities among multiple second network elements in a multi-connection scenario. In an embodiment, UE capability coordination is re-executed when there are multiple PDU sessions.

In step 402, the first network element determines, after receiving the reconfiguration response message of the UE radio bearer context fed back by the second network element, that the second network element completes the reconfiguration of information of the UE radio bearer context; wherein the reconfiguration response message includes one or more of the following information: a second UE association flag, configuration information about DRBs, information about DRB transmission channel downlink address, configuration information about the modified SRBs, and UE capability coordination information.

In an embodiment, the second UE association flag includes an interface AP ID that is allocated by the first network element to uniquely identify the UE, and an interface AP ID that is uniquely allocated for the UE by the second network element; or S-TMSI; or RAN UE ID.

In an embodiment, configuration information about the DRBs includes a list of DRBs set up by the second network element or a list of modified DRBs. In an embodiment, the second network element accepts or rejects one or more DRBs according to resource conditions.

In an embodiment, the information about DRB transmission channel downlink address is in one of the following forms: transmission channel downlink address of each UE, transmission channel downlink address of each protocol data unit PDU session (SESSION), transmission channel downlink address of each service flow, or transmission channel downlink address of each DRB.

In an embodiment, in step 402, after the first network element transmits the reconfiguration request message of the UE radio bearer context, if the second network element fails in the reconfiguration, the second network element feeds back the reconfiguration failure message of the UE radio bearer context to the first network element. When the first network element receives the reconfiguration failure message of the UE radio bearer context fed back by the second network element, the first network element determines that the second network element fails to reconfigure information of the UE radio bearer context. The reconfiguration failure message includes the following one or more of the information: a second UE association flag and a cause of the failure.

In an embodiment, the second UE association flag is: the interface AP ID allocated by the first network element to uniquely identify the UE and an interface AP ID allocated by the second network element to uniquely identify the UE, or the S-TMSI, or the RAN UE ID.

In view of the above, with the process of reconfiguring the UE radio bearer context in the foregoing embodiment, the first network element and the second network element can implement reconfiguration of user context information at the second network element, so as to implement user information management on the fronthaul interface between the network elements.

Figure 5:
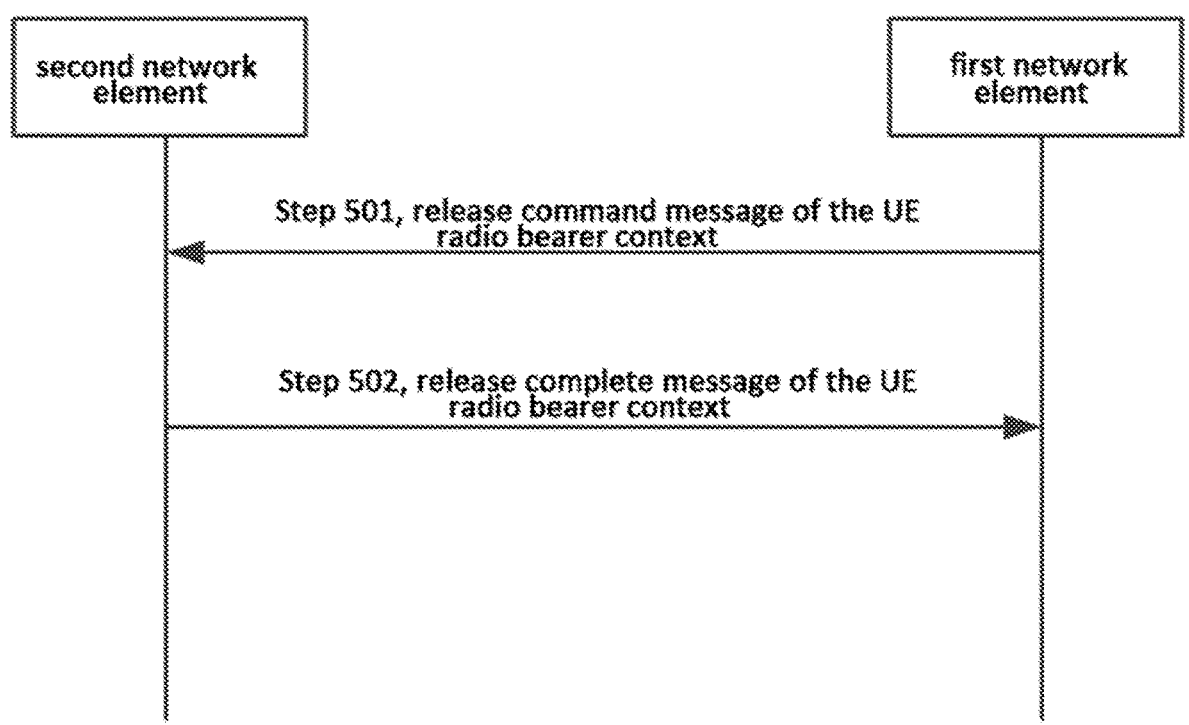
FIG. 5 is a flowchart of a method for user information management according to an embodiment.

An embodiment provides a method for user information management, after establishing the information of the UE radio bearer context, the method further includes a process of releasing the UE radio bearer context. As shown in FIG. 5, the release process includes the following steps.

In step 501, upon determining that the information of the UE radio bearer context at the second network element is required to be released, the first network element transmits a release command message of the UE radio bearer context to the second network element. The release command message includes at least one of the following information: the second UE association flag and a cause of failure.

In an embodiment, the second UE association flag includes: the interface AP ID allocated by the first network element to uniquely identify the UE and an interface AP ID allocated by the second network element to uniquely identify the UE, or the S-TMSI, or the RAN UE ID.

In step 502, upon reception of a release completion message of the UE radio bearer context from the second network element, the first network element determines that the information of UE radio bearer context at the second network element is released. The release completion message includes the second UE association flag.

In an embodiment, the second UE association flag includes an interface AP ID allocated by the first network element to uniquely identify the UE and an interface AP ID allocated by the second network element to uniquely identify the UE; or S-TMSI; or RAN UE ID.

In view of the above, with the process of releasing the UE radio bearer context in the foregoing embodiment, the first network element and the second network element can delete the user context information at the second network element, so as to implement user information management on the fronthaul interface between the network elements.

Figure 6:
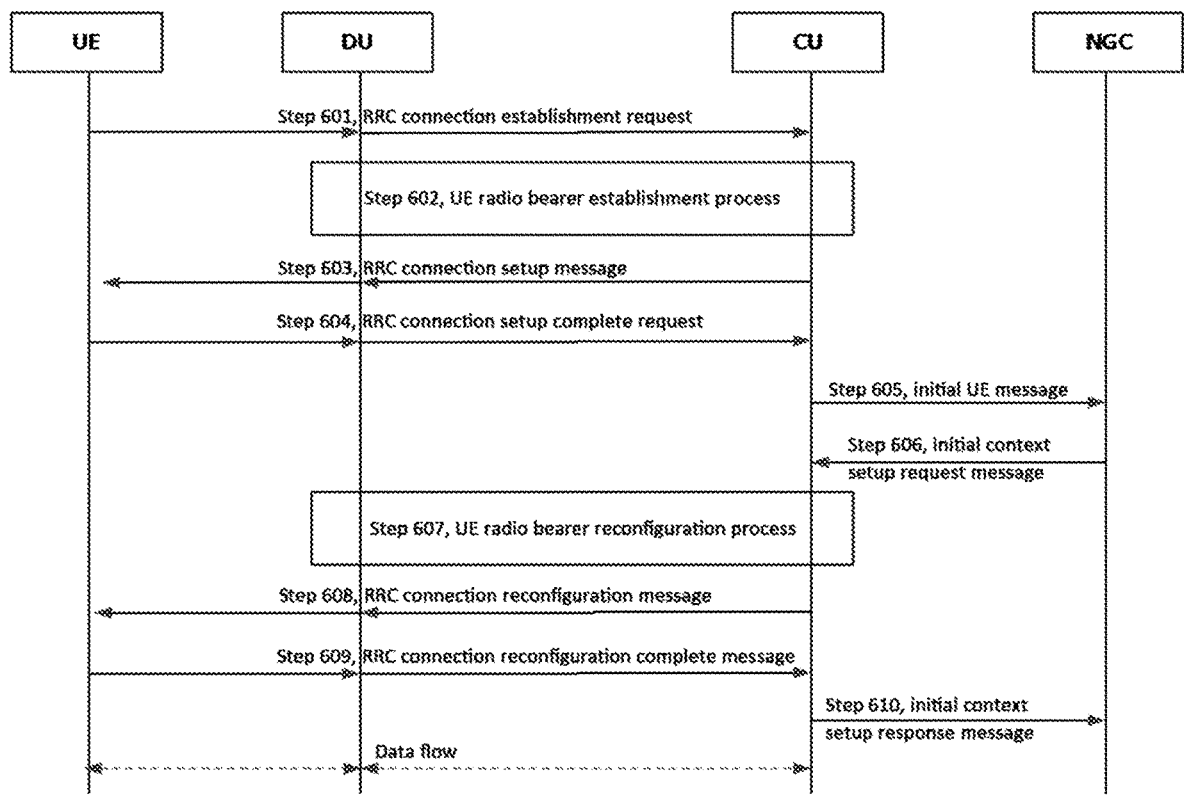
FIG. 6 is a flowchart of a method for user information management according to an embodiment.

An embodiment provides a method for managing user information. In this embodiment, the process of managing user information is described in conjunction with an application scenario. In this embodiment, the first network element is a CU, and the second network element is a DU. As shown in FIG. 6, the method includes the following steps.

In step 601, the CU receives an RRC connection request message of a UE, with which the UE requests to access a RAN.

In step 602, the CU and the DU complete the process of establishing information of the UE radio bearer context at the DU according to the foregoing embodiment.

In step 603, the CU transmits an RRC connection setup message to the UE.

In step 604, after completing the RRC connection setup, the UE returns an RRC connection setup complete message to complete the RRC connection setup of the UE.

In step 605, the CU transmits an initial UE message to 5G core network (NextGen Core, NGC).

In step 606, the NGC transmits an initial context setup request message to the CU.

In step 607, upon reception of the initial context setup request message of the UE, the CU completes the process of reconfiguring the UE radio bearer context at the DU as described in the foregoing embodiment according to the carried PDU session (SESSION) information.

In an embodiment, the process of the CU's reconfiguring the UE radio bearer context for DU triggered by the PDU session setup process is the same as the above process.

In step 608, the CU transmits an RRC Connection Reconfiguration message to the UE.

In step 609, after completing the RRC connection reconfiguration, the UE returns an RRC connection reconfiguration complete message to the CU.

In step 610, the CU transmits an initial context setup response message to the NGC, and the process ends.

The method in the embodiment shown in FIG. 6 can implement user information management on the fronthaul interface between the CU and the DU, and enable user access and management in an architecture in which the first network element and the second network element are separated from each other.

Figure 7:
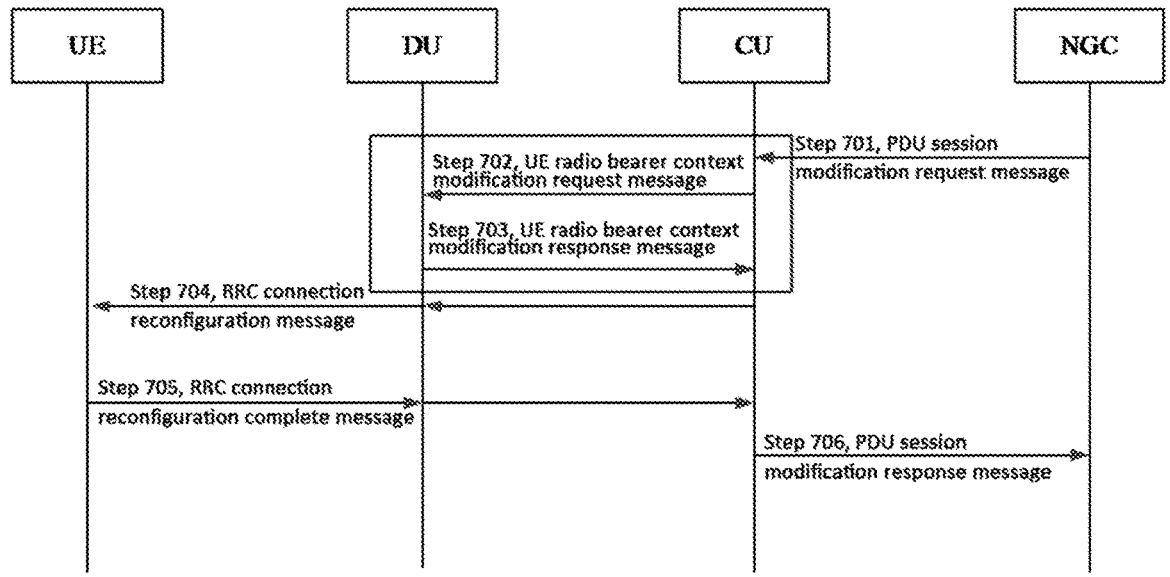
FIG. 7 is a flowchart of a method for user information management according to an embodiment.

An embodiment provides a method for managing user information management. This embodiment describes a PDU session modification process in conjunction with an application scenario. As shown in FIG. 7, the method includes the following steps.

In step 701, the NGC transmits a PDU Session modification request message to the CU.

In step 702, upon reception of the PDU session modification request message, the CU completes the modification of information of the UE radio bearer context at the DU according to the carried PDU session information.

In step 703, the DU feeds back a modification response message of the radio bearer context of the UE to the CU when the modification succeeds.

In step 704, the CU transmits an RRC connection reconfiguration message to the UE.

In step 705, after completing the connection reconfiguration, the UE returns an RRC connection reconfiguration complete message to the CU.

In step 706, the CU transmits a PDU session modification complete message to the NGC, and the process ends.

With the PDU session modification process as described in the embodiment as shown in FIG. 7, user information management on the fronthaul interface between the CU and the DU can be implemented, enabling user access and management in an architecture in which the first network element and the second network element are separated from each other.

Figure 8:
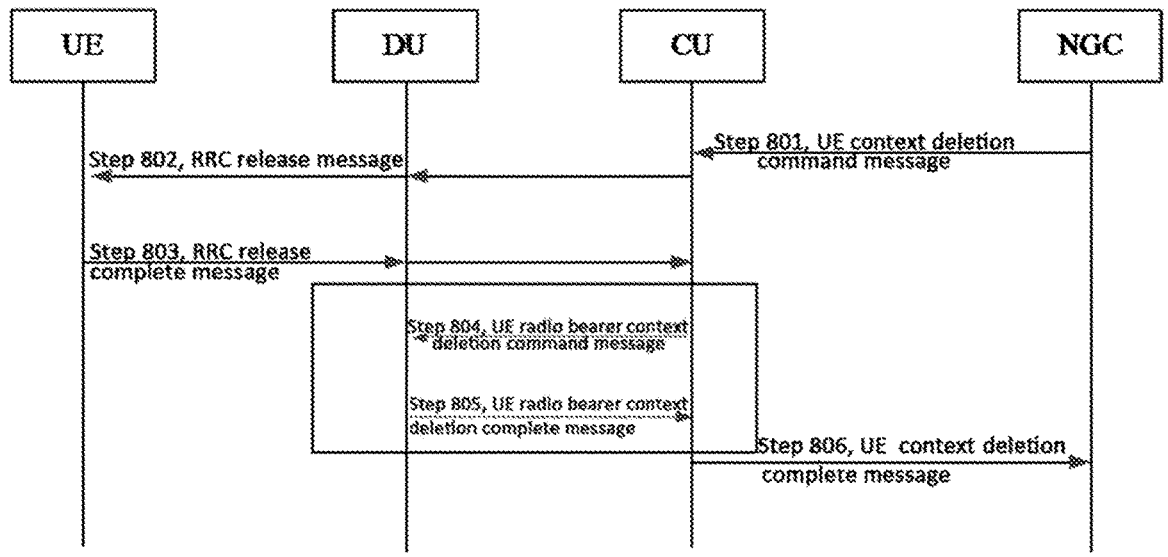
FIG. 8 is a flowchart of a method for user information management according to an embodiment.

An embodiment provides a method for user information management. This embodiment describes a user context release process in conjunction with an application scenario. As shown in FIG. 8, the method includes the following steps.

In step 801, the NGC transmits a UE context release request message (UE context release command) to the CU.

In step 802, after receiving the UE context release request message, the CU transmits an RRC connection release message to the UE.

In step 803, after completing the RRC connection release, the UE transmits an RRC connection release complete message to the CU through the DU.

In step 804, the CU completes the release of the UE radio bearer context at the DU as described in the foregoing embodiment according to the carried user information.

In step 805, the DU transmits a UE radio bearer context release complete message to the CU.

In step 806, the CU transmits a UE context deletion complete message to the NGC, and the process ends.

In an embodiment, the UE supports merely one PDU session. When receiving a PDU session release process, the CU may also trigger the UE radio bearer context release process between the CU and the DU.

In an embodiment, if the UE supports multiple PDU sessions, the CU does not trigger the UE radio bearer context release process between the CU and the DU when receiving the PDU session release process, and reuses the UE radio bearer context reconfiguration process.

With the user context release process provided by the embodiment shown in FIG. 8, user information management on the fronthaul interface between the CU and the DU can be implemented, enabling user access and management in an architecture in which the first network element and the second network element are separated from each other.

Figure 9:
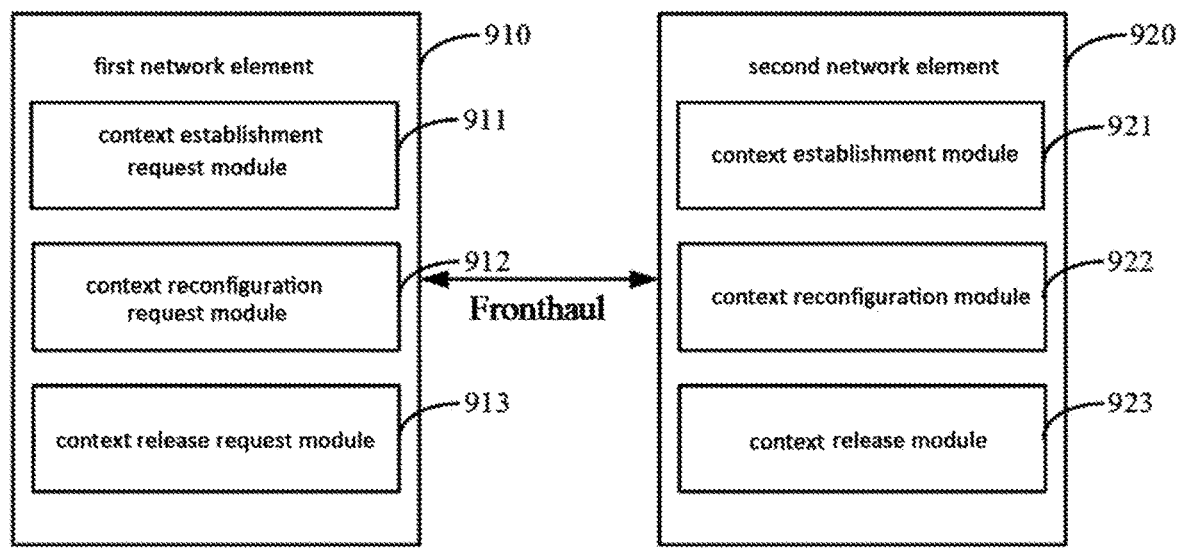
FIG. 9 is a structural block diagram of a system for user information management according to an embodiment.

An embodiment provides a system for user information management. As shown in FIG. 9, the system for user information management includes: a first network element 910 and a second network element 920. A fronthaul interface exists between the first network element 910 and the second network element 920.

The first network element 910 includes: a context setup request module 911.

The context setup request module 911 is configured to transmit a setup request message of a user equipment (UE) radio bearer context to the second network element, and determine that information of the UE radio bearer context is established at the second network element upon reception of a setup response message of the UE radio bearer context fed back by the second network element; wherein the setup request message includes one or more of the following information: a first UE association flag, configuration information about signaling radio bearers (SRBs), and information about SRB transmission channel uplink address.

The second network element 920 includes: a context setup module 921.

The context setup module 921 is configured to locally establish information of the UE radio bearer context upon reception of the setup request message of UE radio bearer context from the first network element, and feed back a setup response message of the UE radio bearer context to the first network element when the setup succeeds; wherein the setup response message includes one or more of the following information: configuration information about SRBs set up by the second network element, configuration information about the modified SRBs, a second UE association flag, information about SRB transmission channel downlink address, and a cause value for configuration modification.

In an embodiment, the context setup module 921 is further configured to feed back a setup failure message of the UE radio bearer context to the first network element when failing to establish the information of the UE radio bearer context, wherein the setup failure message includes one or more of the following information: the second UE association flag and a cause of failure.

In an embodiment, the first network element 910 further includes a context reconfiguration request module 912, and the second network element 920 further includes a context reconfiguration module 922.

The context reconfiguration request module 912 is configured to transmit a reconfiguration request message of the UE radio bearer context to the second network element upon determining that the information of the UE radio bearer context at the second network element is required to be reconfigured, and determine that the second network element completes reconfiguration of the information of the UE radio bearer context upon reception of a reconfiguration response message of the UE radio bearer context fed back by the second network element, wherein the reconfiguration request message includes one or more of the following information: the first UE association flag, configuration information about data radio bearers (DRBs), information about DRB transmission channel uplink address, configuration information about the modified SRBs, and UE capability coordination information.

The context reconfiguration module 922 is configured to reconfigure the established information of the UE radio bearer context upon reception of the reconfiguration request message of the UE radio bearer context from the first network element, and feed back a reconfiguration response message of the UE radio bearer context to the first network element when the reconfiguration succeeds; wherein the configuration response message includes one or more of the following information: configuration information about the DRBs set up by the second network element, configuration information about the modified DRBs, the second UE association flag, information about DRB transmission channel downlink address, configuration information about the modified SRBs, and UE capability coordination information.

In an embodiment, the information about DRB transmission channel uplink address includes: transmission channel uplink address of each UE, transmission channel uplink address of each protocol data unit (PDU) session, transmission channel uplink address of each service flow, or DRB transmission channel uplink address of each DRB.

In an embodiment, the information about DRB transmission channel downlink address includes: transmission channel downlink address of each UE, transmission channel downlink address of each protocol data unit (PDU) session, transmission channel downlink address of each service flow, or DRB transmission channel downlink address of each DRB.

In an embodiment, the context reconfiguration module 922 is further configured to feed back a reconfiguration failure message of the UE radio bearer context to the first network element when the reconfiguration fails, wherein the reconfiguration failure message includes at least one of the following information: the second UE association flag and a cause of failure.

In an embodiment, the first network element 910 further includes a context release request module 913, and the second network element 920 further includes a context release module 923.

The context release request module 913 is configured to transmit a release command message of the UE radio bearer context to the second network element upon determining that the information of the UE radio bearer context at the second network element is required to be released, wherein the release command message includes at least one of the following information: the first UE association flag and a cause of release.

The context release module 923 is configured to perform context release upon reception of the release command message of the UE radio bearer context, and feed back a release completion message of the UE radio bearer context to the first network element; wherein the release completion message includes the second UE association flag.

In an embodiment, the first UE association flag (the UE association flag included in the message transmitted by the first network element 910 to the second network element 920) includes: an application-layer protocol (AP) identifier (ID) allocated by the first network element to uniquely identify the UE, or a temporary mobile subscriber identity (S-TMSI), or a residential access network (RAN) UE ID.

In an embodiment, the second UE association flag (the UE association flag included in the message that the second network element 920 feeds back to the first network element 910) includes: an interface AP ID allocated by the first network element to uniquely identify the UE and an interface AP ID allocated by the second network element to uniquely identify the UE, or the S-TMSI, or the RAN UE ID.

With the system for user information management system provided by the foregoing embodiment, user information management on the fronthaul interface between the CU and the DU can be implemented, enabling user access and management in an architecture in which the first network element and the second network element are separated from each other.

Figure 10:
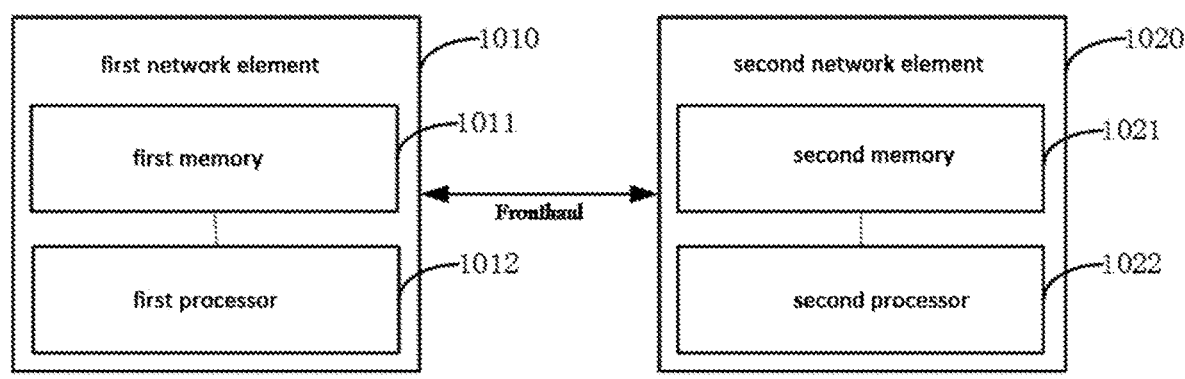
FIG. 10 is a structural block diagram of a system for user information management according to an embodiment.

An embodiment provides a system for managing user information, as shown in FIG. 10. The system includes a first network element 1010 and a second network element 1020.

The first network element 1010 includes a first memory 1011 and a first processor 1012. The first memory 1011 has computer instructions stored therein, and the first processor 1012 executes the computer instructions to implement the following method.

A setup request message of the UE radio bearer context is transmitted to the second network element 1020. Upon reception of a setup response message of the UE radio bearer context fed back by the second network element 1020, it is determined that information of the UE radio bearer context is established by the second network element 1020. The setup request message includes one or more of the following information: a first UE association flag, configuration information about signaling radio bearers (SRBs) and information about SRB transmission channel uplink address.

The second network element 1020 includes a second memory 1021 and a second processor 1022. The second memory 1021 has computer instructions stored therein, and the second processor 1022 executes the computer instructions to implement the following method:

upon reception of the setup request message of UE radio bearer context from the first network element 1010, information of the UE radio bearer context is locally established. When the setup succeeds, a setup response message of the UE radio bearer context feeds back to the first network element 1010. The setup response message includes one or more of the following information: configuration information about SRBs set up by the second network element, configuration information about the modified SRBs, a second UE association flag, information about SRB transmission channel downlink address, and a cause value for configuration modification.

In an embodiment, the second processor 1022 is further configured to feed back a setup failure message of the UE radio bearer context to the first network element 1010 when failing to establish the information of the UE radio bearer context, wherein the setup failure message includes at least one of the following information: the second UE association flag and a cause of failure.

In an embodiment, the first processor 1012 is further configured to transmit a reconfiguration request message of the UE radio bearer context to the second network element 1020 upon determining that the information of the UE radio bearer context at the second network element 1020 is required to be reconfigured, the reconfiguration request message includes at least one of the following information: the first UE association flag, configuration information about data radio bearer (DRBs), information about DRB transmission channel uplink address, configuration information about the modified SRBs, or UE capability coordination information.

In an embodiment, the second processor 1022 is configured to reconfigure the established information of the UE radio bearer context upon reception of the reconfiguration request message of the UE radio bearer context, and feed back a reconfiguration response message of the UE radio bearer context to the first network element 1010 when the reconfiguration succeeds; wherein the configuration response message includes at least one of the following information: configuration information about the DRBs set up by the second network element 1020, configuration information about the modified DRBs, the second UE association flag, information about DRB transmission channel downlink address, configuration information about the modified SRBs, and UE capability coordination information.

In an embodiment, the information about DRB transmission channel uplink or downlink address includes: transmission channel uplink or downlink address of each UE, transmission channel uplink or downlink address of each protocol data unit (PDU) session, transmission channel uplink or downlink address of each service flow, or DRB transmission channel uplink or downlink address of each DRB.

In an embodiment, the second processor 1022 is further configured to feed back a reconfiguration failure message of the UE radio bearer context to the first network element 1010 when the reconfiguration fails, the reconfiguration failure message includes at least one of the following information: the second UE association flag and a cause of failure.

In an embodiment, the first processor 1012 is further configured to transmit a release command message of the UE radio bearer context to the second network element 1020 upon determining that the information of the UE radio bearer context at the second network element 1020 is required to be released, the release command message includes at least one of the following information: the first UE association flag and a cause of release.

In an embodiment, the second processor 1022 is further configured to perform context release upon reception of the release command message of the UE radio bearer context, and feed back a release completion message of the UE radio bearer context to the first network element 1010, the release completion message includes the second UE association flag.

In an embodiment, the message transmitted to the second processor 1022 by the first processor 1012 includes a UE association flag (i.e., first UE association flag), which includes an application-layer protocol (AP) identifier (ID) allocated by the first network element to uniquely identify the UE, or a temporary mobile subscriber identity (S-TMSI), or a radio access network (RAN) UE ID. And, the message fed back to the first processor 1012 by the second processor 1022 includes a UE association flag (i.e., second UE association flag), which includes: the interface AP ID allocated by the first network element to uniquely identify the UE and an interface AP ID allocated by the second network element to uniquely identify the UE, or the S-TMSI, or the RAN UE ID.

The user information management system provided in the foregoing embodiments can implement user information management on the fronthaul interface between the first network element and the second network element, and enable user access and management in an architecture in which the first network element and the second network element are separated from each other.

In an embodiment, all or part of steps of the various methods in the above embodiments may be implemented by instructing related hardware using a program, the program may be stored in a computer readable storage medium, which may include a Read-Only Memory (ROM), a Random Access Memory (RAM), a magnetic disk, a compact disc, or the like.

An embodiment provides a computer readable storage medium, stores computer readable instructions which are configured to perform the method as described in any of the above embodiments.

In an embodiment, the above technical solutions are embodied in the form of a software product stored in a storage medium, including one or more instructions cause a computer device (such as a personal computer, a server, or a network device, etc.) to perform all or part of the steps of the methods described in the above embodiments.

INDUSTRY APPLICABILITY

The user information management method and device can implement user information management on a fronthaul interface between the first network element and the second network element.

The invention claimed is:

1. A method for wireless communication, comprising:
   transmitting, by a centralized unit to a distributed unit that is in communication with the centralized unit via a fronthaul interface, a setup request message for establishing a user equipment (UE) radio bearer context, wherein the setup request message comprises a first application-layer protocol (AP) identifier (ID) allocated by the centralized unit to uniquely identify the UE and configuration information about one or more signaling radio bearers;
   receiving, by the centralized unit, a setup response message from the distributed unit indicating that the distributed unit has established the UE radio bearer context, wherein the setup response message comprises the first AP ID allocated by the centralized unit to uniquely identify the UE, a second AP ID allocated by the distributed unit to uniquely identify the UE, and configuration information about one or more signal radio bearers set up by the distributed unit;
   transmitting, from the centralized unit to the distributed unit, a reconfiguration request message for modifying the UE radio bearer context, wherein the reconfiguration request message comprises the first AP ID allocated by the centralized unit to uniquely identify the UE, the second AP ID allocated by the distributed unit to uniquely identify the UE, and configuration information about one or more data radio bearers; and
   receiving, by the centralized unit, a reconfiguration response message from the distributed unit indicating that the distributed unit has modified the UE radio bearer context, wherein the reconfiguration response message includes the first AP ID allocated by the centralized unit to uniquely identify the UE, the second AP ID allocated by the distributed unit to uniquely identify the UE, and a list of modified data radio bearers.

2. The method of claim 1, further comprising:
   receiving, by the centralized unit, a setup failure message indicating that the distributed unit has failed to establish the UE radio bearer context, wherein the setup failure message includes the first AP ID allocated by the centralized unit to uniquely identify the UE, the second AP ID allocated by the distributed unit to uniquely identify the UE, and a cause of failure.

3. The method of claim 1, further comprising:
receiving, by the centralized unit, a reconfiguration failure message from the distributed unit indicating that a modification of the UE radio bearer context at the distributed unit has failed, wherein the reconfiguration failure message includes the first AP ID that uniquely identifies the UE by the centralized unit, the second AP ID that uniquely identifies the UE by the distributed unit, and a cause of failure.

4. The method of claim 1, wherein the reconfiguration request message comprises a transmission channel uplink address of each of the one or more data radio bearers.

5. The method of claim 1, wherein the reconfiguration response message comprises a transmission channel downlink address of each of the modified data radio bearers.

6. A method for wireless communication, comprising:
receiving, at a distributed unit from a centralized unit that is in communication with the distributed unit via a fronthaul interface, a setup request message for establishing a user equipment (UE) radio bearer context, wherein the setup request message comprises a first application-layer protocol (AP) identifier (ID) allocated by the centralized unit to uniquely identify the UE and configuration information about one or more signaling radio bearers;
transmitting, from the distributed unit, a setup response message to the centralized unit indicating that the distributed unit has established the UE radio bearer context, wherein the setup response message includes the first AP ID allocated by the centralized unit to uniquely identify the UE, a second AP ID allocated by the distributed unit to uniquely identify the UE, and configuration information about one or more signal radio bearers set up by the distributed unit;
receiving, at the distributed unit from the centralized unit, a reconfiguration request message for modifying the UE radio bearer context, wherein the reconfiguration request message comprises the first AP ID allocated by the centralized unit to uniquely identify the UE, the second AP ID allocated by the distributed unit to uniquely identify the UE, and configuration information about one or more data radio bearers; and
transmitting, by the distributed unit, a reconfiguration response message to the centralized unit indicating that the distributed unit has modified the UE radio bearer context, wherein the reconfiguration response message includes the first AP ID allocated by the centralized unit to uniquely identify the UE, the second AP ID allocated by the distributed unit to uniquely identify the UE, and a list of modified data radio bearers.

7. The method of claim 6, further comprising:
transmitting, by the distributed unit, a setup failure message indicating that the distributed unit has failed to establish the UE radio bearer context, wherein the setup failure message includes the first AP ID allocated by the centralized unit to uniquely identify the UE, the second AP ID allocated by the distributed unit to uniquely identify the UE, and a cause of failure.

8. The method of claim 6, wherein the reconfiguration request message comprises a transmission channel uplink address of each of the one or more data radio bearers.

9. The method of claim 6, wherein the reconfiguration response message comprises a transmission channel downlink address of each of the modified data radio bearers.

10. The method of claim 6, further comprising:
transmitting, by the distributed unit, a reconfiguration failure message to the centralized unit indicating that a modification of the UE radio bearer context at the distributed unit has failed, wherein the reconfiguration failure message includes the first AP ID that uniquely identifies the UE by the centralized unit, the second AP ID that uniquely identifies the UE by the distributed unit, and a cause of failure.

11. A device for wireless communication, comprising:
a processor; and
a memory including processor executable code, wherein the processor executable code upon execution by the processor configures the processor to:
transmit, to a distributed unit via a fronthaul interface, a setup request message for establishing a user equipment (UE) radio bearer context, wherein the setup request message comprises a first application-layer protocol (AP) identifier (ID) allocated by the device to uniquely identify the UE and configuration information about one or more signaling radio bearers;
receive a setup response message from the distributed unit indicating that the distributed unit has established the UE radio bearer context, wherein the setup response message includes the first AP ID allocated by the device to uniquely identify the UE, a second AP ID allocated by the distributed unit to uniquely identify the UE, and configuration information about one or more signal radio bearers set up by the distributed unit;
transmit, to the distributed unit, a reconfiguration request message for modifying the UE radio bearer context, wherein the reconfiguration request message comprises the first AP ID allocated by the device to uniquely identify the UE, the second AP ID allocated by the distributed unit to uniquely identify the UE, and configuration information about one or more data radio bearers; and
receive a reconfiguration response message from the distributed unit indicating that the distributed unit has modified the UE radio bearer context, wherein the reconfiguration response message includes the first AP ID allocated by the device to uniquely identify the UE, the second AP ID allocated by the distributed unit to uniquely identify the UE, and a list of modified data radio bearers.

12. The device of claim 11, wherein the processor executable code upon execution by the processor configures the processor to:
receive a setup failure message indicating that the distributed unit has failed to establish the UE radio bearer context, wherein the setup failure message includes the first AP ID allocated by the device to uniquely identify the UE, the second AP ID allocated by the distributed unit to uniquely identify the UE, and a cause of failure.

13. The device of claim 11, wherein the processor executable code upon execution by the processor configures the processor to:
receive a reconfiguration failure message from the distributed unit indicating that a modification of the UE radio bearer context at the distributed unit has failed, wherein the reconfiguration failure message includes the first AP ID that uniquely identifies the UE by the device, the second AP ID that uniquely identifies the UE by the distributed unit, and a cause of failure.

14. The device of claim 11, wherein the reconfiguration request message comprises a transmission channel uplink address of each of the one or more data radio bearers.

15. The device of claim 11, wherein the reconfiguration response message comprises a transmission channel downlink address of each of the modified data radio bearers.

16. A device for wireless communication, comprising:
a processor; and
a memory including processor executable code, wherein the processor executable code upon execution by the processor configures the processor to:
receive, from a centralized unit via a fronthaul interface, a setup request message for establishing a user equipment (UE) radio bearer context, wherein the setup request message comprises a first application-layer protocol (AP) identifier (ID) allocated by the centralized unit to uniquely identify the UE and configuration information about one or more signaling radio bearers;
transmit a setup response message to the centralized unit indicating that the UE radio bearer context has been established, wherein the setup response message includes the first AP ID allocated by the centralized unit to uniquely identify the UE, a second AP ID allocated by the device to uniquely identify the UE, and configuration information about one or more established signal radio bearers;
receive, from the centralized unit, a reconfiguration request message for modifying the UE radio bearer context, wherein the reconfiguration request message comprises the first AP ID allocated by the centralized unit to uniquely identify the UE, the second AP ID allocated by the device to uniquely identify the UE, and configuration information about one or more data radio bearers; and transmit a reconfiguration response message to the centralized unit indicating that the UE radio bearer context has been modified, wherein the reconfiguration response message includes the first AP ID allocated by the centralized unit to uniquely identify the UE, the second AP ID allocated by the device to uniquely identify the UE, and a list of modified data radio bearers.

17. The device of claim 16, wherein the processor executable code upon execution by the processor configures the processor to:
transmit a setup failure message indicating that the UE radio bearer context has failed to be established, wherein the setup failure message includes the first AP ID allocated by the centralized unit to uniquely identify the UE, the second AP ID allocated by the device to uniquely identify the UE, and a cause of failure.

18. The device of claim 16, wherein the reconfiguration request message comprises a transmission channel uplink address of each of the one or more data radio bearers.

19. The device of claim 16, wherein the reconfiguration response message comprises a transmission channel downlink address of each of the modified data radio bearers.

20. The device of claim 16, wherein the processor executable code upon execution by the processor configures the processor to:
transmit a reconfiguration failure message to the centralized unit indicating that a modification of the UE radio bearer context has failed, wherein the reconfiguration failure message includes the first AP ID that uniquely identifies the UE by the centralized unit, the second AP ID that uniquely identifies the UE by the device, and a cause of failure.

* * * * *